(12) United States Patent
Nuckols et al.

(10) Patent No.: US 6,346,141 B1
(45) Date of Patent: Feb. 12, 2002

(54) SUPPLYING BREATHABLE GAS FOR UNDERWATER HABITAT

(75) Inventors: Marshall L. Nuckols, Annapolis, MD (US); Jeremy A. Pelstring, Fairfax, VA (US); Benjamin M. Stinespring, Monterey, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/499,172

(22) Filed: Feb. 7, 2000

(51) Int. Cl.⁷ .......................... B01D 47/00; B01D 53/14
(52) U.S. Cl. .............. 95/236; 95/254; 96/361; 128/205.28
(58) Field of Search ............ 128/205.28; 96/361; 95/236, 254

(56) References Cited

U.S. PATENT DOCUMENTS 3,722,179 A  *  3/1973  Moen et al. ............... 55/40

* cited by examiner

Primary Examiner—John G. Weiss
Assistant Examiner—Darwin P. Erezo
(74) Attorney, Agent, or Firm—Donald G. Peck; Harvey A. Gilbert

(57) ABSTRACT

A system and method are provided for supplying breathable gas to an underwater habitat submerged in water. A flow of respired gas that includes metabolically-produced carbon dioxide is extracted from the underwater habitat and mixed with water from the surrounding environment. As a result of such mixing, carbon dioxide in the respired gas is substantially absorbed by the water while a first gas is produced. Moisture in the first gas is filtered out to produce a breathable gas which is then introduced back into the underwater habitat.

29 Claims, 2 Drawing Sheets

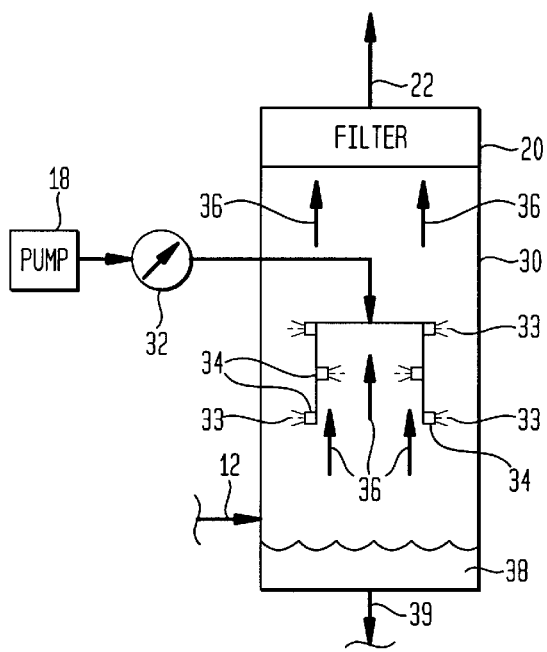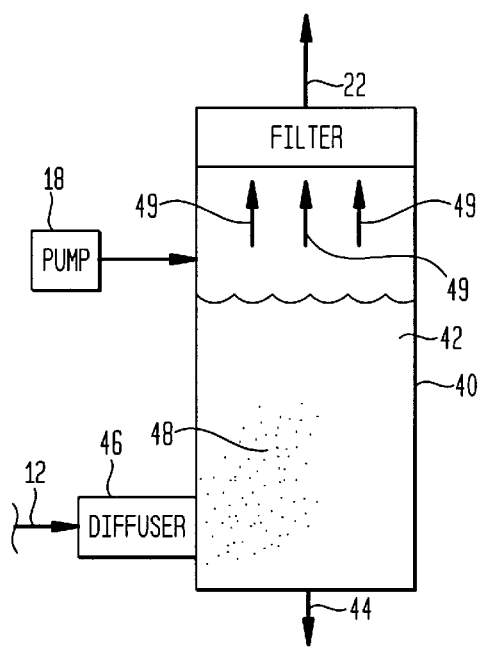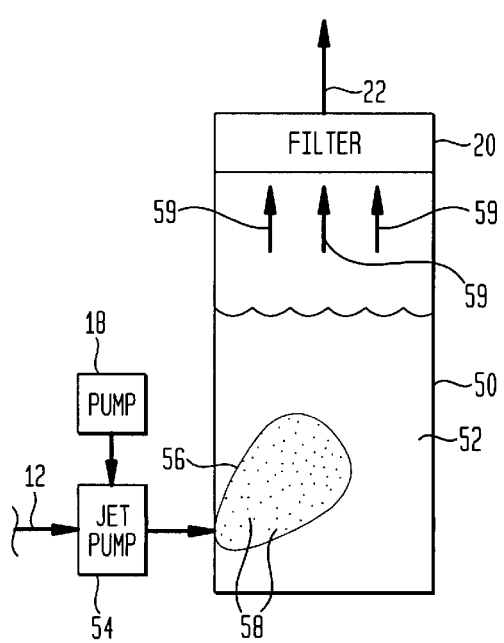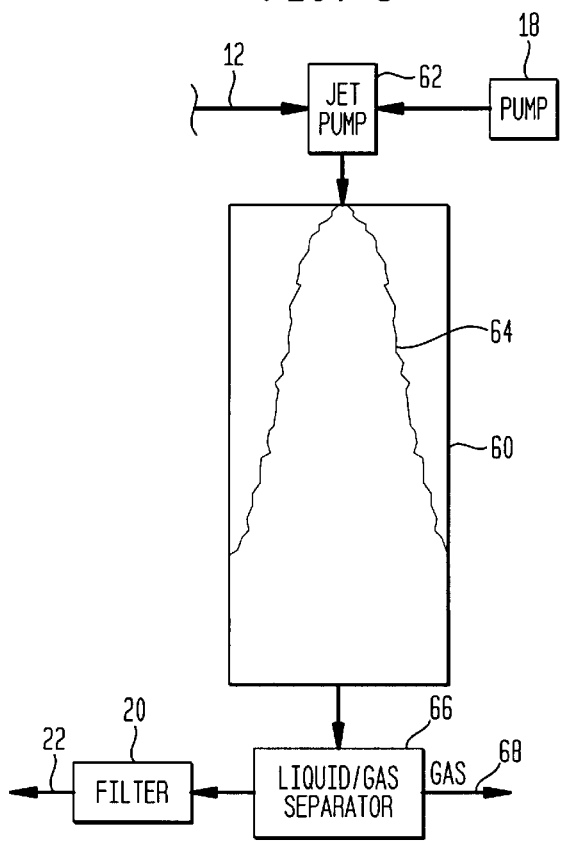

SUPPLYING BREATHABLE GAS FOR UNDERWATER HABITAT

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to life support for underwater habitable environments (e.g., habitats, submersibles, submarines, etc.), and more particularly to method and system for supplying breathable gas for an underwater habitable environment using the surrounding water environment to remove carbon dioxide from respired gases within the underwater habitable environment.

BACKGROUND OF THE INVENTION

A recurring problem for designers of closed-circuit breathing apparatus used in underwater habitats is the removal of metabolically-produced carbon dioxide from the breathing gas. Traditional methods include the use of dry chemical beds, regenerative cycles, or complex physical techniques. All these methods, however, have drawbacks. Expendable, dry chemicals must be replenished and disposed of at considerable trouble and expense on a frequent basis, and are therefore not suitable for long-term deployment applications. Regenerative cycle systems use small amounts of expendables, but require large amounts of energy for operation. Physical methods typically use fragile and expensive membranes for operation, and have proven impractical in an operational environment for personal life support systems.

SUMMARY OF THE INVENTION

Accordingly, it is an object of the present invention to provide a method and system that can supply breathable gas lo an underwater habitat.

Another object of the present invention is to provide a closed-circuit method and system for supplying breathing gas to a submerged underwater habitat.

Still another object of the present invention is to provide a method and system that can supply breathable gas to an underwater habitat without the use of chemically-based carbon dioxide absorbents.

Yet another object of the present invention is to provide a method and system that can supply breathable gas to an underwater environment in a simple, reliable, efficient and safe manner.

Other objects and advantages of the present invention will become more obvious hereinafter in the specification and drawings.

In accordance with the present invention, a system and method are provided for supplying breathable gas to an underwater habitat submerged in water. A flow of respired gas that includes metabolically-produced carbon dioxide is extracted from the underwater habitat. The flow of respired gas is mixed with water from the surrounding environment. As a result of such mixing, carbon dioxide in the respired gas is substantially absorbed by the water while a first gas is allowed to escape from the mixing water. Moisture in the first gas is filtered out to produce a breathable gas which is then introduced back into the underwater habitat.

BRIEF DESCRIPTION OF THE DRAWINGS

FIG. 3 is a schematic diagram of an embodiment of the mixer used in the present invention;

FIG. 4 is a schematic diagram of an alternative mixer arrangement;

FIG. 5 is a schematic diagram of another alternative mixer arrangement;

FIG. 6 is a schematic diagram of yet another alternative mixer arrangement; and

DETAILED DESCRIPTION OF THE INVENTION

Figure 1:
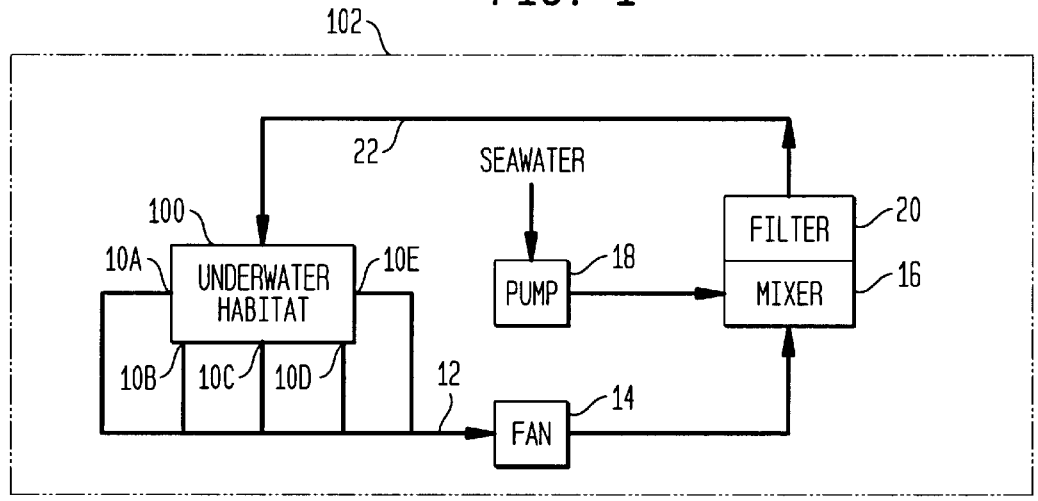
FIG. 1 is a block diagram of the system that provides breathable gas to an underwater habitat in accordance with an embodiment of the present invention.

Referring now to the drawings, and more particularly to FIG. 1, one embodiment of a system for supplying breathable gas to an underwater habitat 100 submerged in a water environment 102 is shown in block diagram form. Underwater habitat 100 as used herein refers to any manned habitat, submersible, submarine, etc., in which respired gas from the individuals therein must be extracted and processed to produce a breathable gas. That is, carbon dioxide must be removed from the respired gas. Water environment 102 is any fresh or seawater environment. For purpose of this description, it will be assumed that water environment 102 is a seawater environment. The system of the present invention can be contained within or without a pressure hull (not shown) that typically encompasses underwater habitat 100.

Respired gas within habitat 100 is typically extracted at a plurality of ventilation points 10A, 10B, . . . distributed throughout habitat 100 and coupled to a common conduit or duct 12. A fan 14 draws the respired gas from habitat 100 through ventilation points 10A, 10B, . . . and into duct 12. The respired gas is fed to a mixer 16 which also receives a supply of seawater from the surrounding water environment 102. A pump 18 can be used to provide the necessary flow of seawater into mixer 16. Mixer 16 removes substantially all of the carbon dioxide from the respired gas as the respired gas is mixed with seawater. More specifically, the seawater absorbs substantially all of the carbon dioxide. The gas remaining after such absorption is filtered at a filter 20 to remove any excess moisture before being returned via duct 22 as breathable gas to habitat 100.

The carbon dioxide absorption process carried out by mixer 16 is based on the chemical reactions brought about by mixing carbon dioxide and water. These reactions include $$CO_{2\,gas} \rightleftharpoons CO_{2\,aqueous} \qquad (A)$$

$$CO_{2\,aqueous} + H_2O \rightleftharpoons H_2CO_3 \qquad (B)$$

$$H_2CO_3 \rightleftharpoons H^+ + HCO_3^- \qquad (C)$$

$$HCO_3^- \rightleftharpoons H^+ + CO_3^{2-} \qquad (D)$$

However, in high pH conditions, the reaction that predominates is

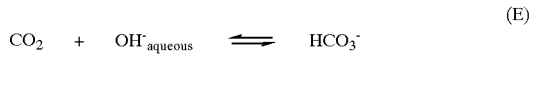
(E)

The first four reactions are rather slow, i.e., half-lives as great as 100 seconds or more. However, reaction (E) occurs nearly instantaneously and is essentially dependent on the rate of dissolution of $CO_2$ gas into the seawater. of importance in the design of an absorption system utilizing seawater is the total absorptive capacity of the seawater. This capacity, denoted as $C_T$, represents the maximum concentration of all $CO_2$ products in the water. By convention, square brackets [ ] are used herein to represent the concentrations of each species in moles per liter (mol-$L^{-1}$). Thus, $C_T$ can be expressed as $$C_T = [H_2CO_3^*] + [HCO_3^-] + [CO_3^{2-}] \quad (1)$$

where $$[H_2CO_3^*] = [H_2CO_3] + [CO_{2aqueous}] \quad (2)$$

This maximum capacity for $CO_2$, that is, the total concentration of all species of $CO_2$ when the seawater is saturated, can be computed using an expression $$C_T = \frac{P_{CO_2}}{\alpha_0} k_H \quad (3)$$

which is based on Henry's Law of Solubility of a gas. In equation (3), $P_{CO2}$ is the partial pressure of carbon dioxide in the air stream in atmospheres absolute (Ata);

$k_H$ is Henry's Law Constant, representing the absorption equilibrium at a particular gas temperature; and $$\alpha_0 = \left(1 + \frac{K_1}{[H^+]} + \frac{K_1 K_2}{[H^+]^2}\right)^{-1} \quad (4)$$

where $K_1$ and $K_2$ are equilibrium constants for the reactions in reactions (C) and (D), respectively. The values for these equilibrium constants have previously been tabulated for various temperatures in both fresh and seawater mediums as given in Table 1 below.

TABLE 1

Equilibrium Constants For Carbon Dioxide Solubility

| Temp, °C | -log $K_1$ | | -log $K_2$ | |
|---|---|---|---|---|
| | Fresh | Seawater | Fresh | Seawater |
| 0 | 6.579 | — | 10.625 | 9.40 |
| 5 | 6.517 | 6.01 | 10.557 | 9.34 |
| 10 | 6.464 | — | 10.490 | 9.28 |
| 14 | — | 6.02 | — | — |
| 15 | 6.419 | — | 10.430 | 9.23 |
| 20 | 6.381 | — | 10.377 | 9.17 |
| 22 | — | 5.89 | — | 9.12 |
| 25 | 6.352 | — | 10.329 | 9.10 |

The constant $K_1$ is the ratio $$K_1 = \frac{[H^+][CO_3^{2-}]}{[HCO_3^-]} \quad (5)$$

The constant $K_2$ is the ratio $$K_2 = \frac{[H^+][CO_3^{2-}]}{[HCO_3^-]} \quad (6)$$

These constants are both weak functions of temperature and salinity, but the ionization constant can be shown to decrease rapidly as the pH of the water increases because pH=−log $[H^+]$. Using these constants and Equation (3), the potential quantities of carbon dioxide that can be so absorbed to saturate water at various pH levels can be calculated.

For instance, seawater with a pH of 8 can be shown to have an ionization constant of approximately 0.006 at 25° C. (assuming −log $K_1$ is approximately 5.8). Applying Equation (3), the concentration of all species of $CO_2$ when seawater is saturated at this temperature can be calculated. Unlike the absorption levels for other non-reacting gases (e.g., helium, hydrogen, etc.), the absorption levels for carbon dioxide are substantially higher due to the fact that carbon dioxide reacts with water as described above. The high absorption potentials suggest that seawater could be used to scrub carbon dioxide from cabin air in underwater applications while minimizing the removal of significant quantities of other components of the cabin atmosphere.

Figure 2:
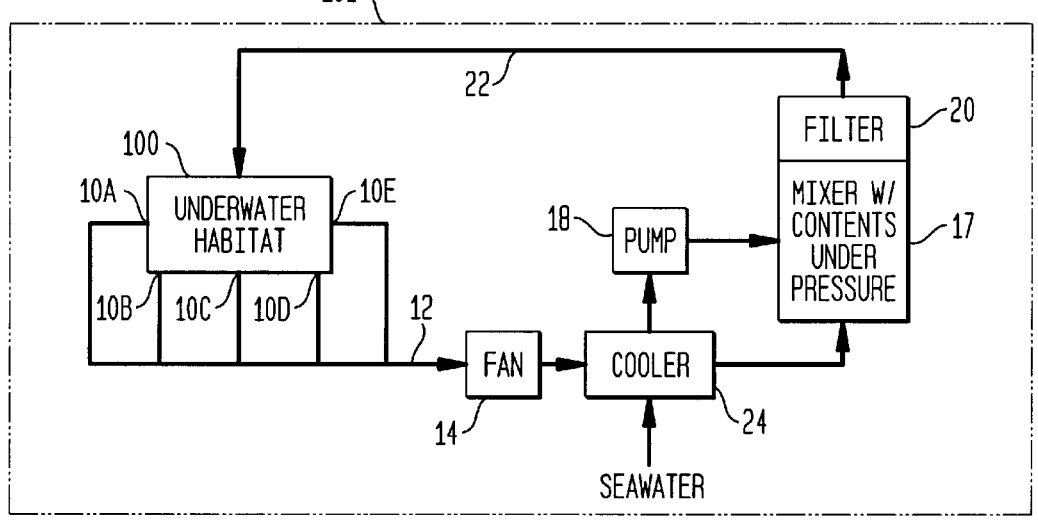
FIG. 2 is a block diagram of another embodiment of the system of the present invention.

The solubility of carbon dioxide in water increases with increasing pressure and decreasing temperature. Accordingly, another embodiment of the present invention is illustrated in block diagram form in FIG. 2. Like reference numerals are used for the elements that are common with the embodiment illustrated in FIG. 1. A cooler 24 is provided in-line with one or both (as shown) of the respired gas and water feeds to reduce the temperature thereof prior to their mixing at a mixer 17 that supports pressurized mixing. Note that, at increased pressures, the solubility of other gases such as nitrogen, helium and oxygen, also increases. Accordingly, it may be necessary to monitor and add back certain constituents when levels thereof (in the breathable gas supplied to habitat 100) drop below a specified level.

By way of examples, embodiments of mixer 16 and mixer 17 will now be described with the aid of FIGS. 3–6. In FIG. 3, a vessel 30 (i.e., unpressurized in the case of mixer 16 and pressurized in the case of mixer 17) receives the respired gas via duct 12 at a lower portion thereof. Seawater is supplied to vessel 30 via pump 18. The seawater's flow rate is monitored by a flowmeter 32 before being sprayed into and throughout vessel 30 as a fine mist 33 using a plurality of spray nozzles or atomizers 34. The flowrate of seawater supplied to vessel 30 is based on predicted carbon dioxide partial pressure $P_{CO2}$ $$P_{CO_2} = \frac{V(O_2)(RQ)t}{26.3(V_T)} \left(\frac{T}{530}\right) + (P_{CO_2})_i \quad (7)$$

where $P_{CO2}$ and $(P_{CO2})_i$ are the instantaneous and initial, respectively, partial pressures in atmospheres;

$V_T$ is the cabin volume in cubic feet;

$V(O_2)$ is the total crew oxygen consumption rate in standard liters per minute;

RQ is the ratio of carbon dioxide produced to oxygen consumed;

T is the cabin temperature in degrees Rankine; and t is an amount of time in minutes.

As the carbon dioxide is absorbed in vessel 30, a resulting gas (represented by arrows 36) rises upward in vessel 30 while the carbon dioxide enriched seawater 38 collects in the bottom of vessel 30. Gas 36 is filtered by filter 20 to remove water droplets therefrom prior to returning to the underwater habitat via duct 22. Carbon dioxide enriched seawater 38 is drained via conduit 39 back to the surrounding seawater environment.

Another embodiment of mixer 16/mixer 17 is illustrated in FIG. 4 where a vessel 40 is substantially filled with a circulation of seawater 42 supplied via pump 18 and drained to the surrounding seawater environment via drain 44. Respired gas from underwater habitat 100 is passed through a diffuser 46 mounted, for example, in a lower portion of vessel 40. As a result, the respired gas enters seawater 42 as tiny gas bubbles 48. The large surface area of bubbles 48 (as compared to a straight flow of respired gas) maximizes carbon dioxide absorption efficiency. Gas 49 emitted from seawater 42 at the upper portion vessel 40 is filtered for moisture removal by filter 20 to produce the breathable gas that is returned via duct 22.

A third embodiment of mixer 16/mixer 17 is illustrated in FIG. 5 where a vessel 50 substantially filled with seawater 52 receives a mixture of seawater and respired gas. More specifically, a jet pump 54 is coupled to duct 12 and pump 18 to receive the respired gas and seawater, respectively. Jet pump 54 turbulently mixes the respired gas and seawater such that a liquid/gas bubble mixture 56 is injected into seawater 52. Note that jet pump 54 could provide the higher pressures used by mixer 17. Tiny gas bubbles 58 within mixture 56 maximize the surface area for carbon dioxide absorption as they rise through seawater 52. A drain 58 allows excess levels of seawater 52 to drain front vessel 50 back to the surrounding seawater environment. Gas 59 emitted from seawater 52 at the upper portion of vessel 50 is filtered for moisture removal by filter 20 to produce the breathable gas that is returned via duct 22.

A fourth embodiment of mixer 16/mixer 17 is illustrated in FIG. 6 where a vessel 60 again receives a mixture of seawater and respired gas. In this embodiment, however, the mixture is injected into a gas-filled portion of vessel 60. More specifically, a jet pump 62 is coupled to duct 12 and pump 18 to respectively receive the respired gas and seawater. Jet pump 62 turbulently mixes the respired gas and seawater and injects the resulting mixture 64 into vessel 60. The frothing action of mixture 64 facilitates the absorption of the carbon dioxide by the seawater. Mixture 64 collects at the bottom of vessel 60 where it is passed through a liquid/gas separator 66. The separated liquid (i.e., the carbon dioxide enriched seawater) is allowed to drain at 68 to the surrounding seawater environment and the separated gas is moisture-filtered by filter 20 to produce the breathable gas that is returned via duct 22.

Figure 7:
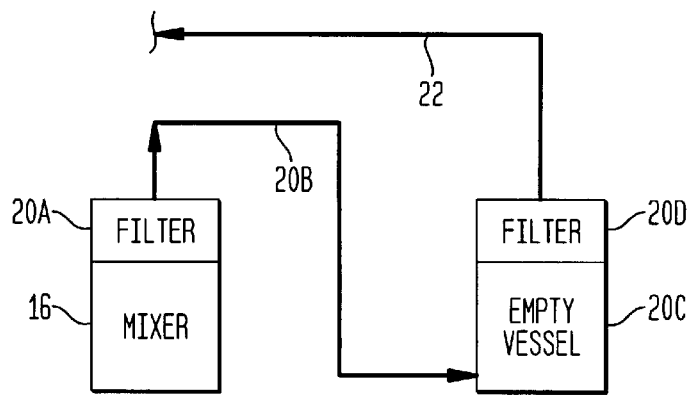
FIG. 7 is a schematic diagram of a two-stage filtering process/apparatus.

Filter 20 can be realized by a single or multiple stage design. One example of such a two-stage filtering process/apparatus is illustrated in block diagram form in FIG. 7. A first filter 20A is coupled to mixer 16 (or mixer 17 as the case may be) to serve as the primary moisture removal station from the gas emitted after carbon dioxide absorption as described above. The first filtered gas is passed via a conduit 20B to an empty vessel 20C where it is then filtered by a second filter 20D before being passed to duct 22. The provision of empty vessel 20C and second filter 20D provides extra dwell time for a more complete carbon dioxide absorption by the moisture remaining after filtering by filter 20.

The advantages of the present invention are numerous. Carbon dioxide is directly absorbed by a non-chemical absorbent (e.g., seawater) that is in a ready and unending supply about an underwater habitat. This eliminates the problems associated with chemical absorbent replenishment and disposal. Enhanced carbon dioxide absorption can be achieved by simply cooling the seawater used for absorption and/or increasing the pressurization during the absorption process. Thus, the present invention can readily adapt to increased or decreased levels of metabolically-produced carbon dioxide. The present invention can be used as the primary or backup carbon dioxide absorption system. Power requirements and system costs are low thereby making the system a good choice for use in an underwater habitat life support system.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for supplying breathable gas to an underwater habitat submerged in water, comprising:

means for extracting a flow of respired gas from the underwater habitat, said respired gas including carbon dioxide;

a mixer, coupled to said means for extracting, for mixing said flow of respired gas with water wherein said carbon dioxide in said respired gas is substantially absorbed by the water in said mixer and a first gas escapes from the water in said mixer;

a filter coupled to said mixer for filtering out moisture in said first gas to produce a breathable gas; and means for introducing said breathable gas into the underwater habitat.

2. A system as in claim 1 wherein said mixer comprises:

a vessel;

means for circulating water through said vessel; and a diffuser, coupled in-line between said means for extracting and said vessel, for causing said flow of said respired gas to enter the water in said vessel as bubbles.

3. A system as in claim 1 wherein said mixer comprises:

a vessel coupled to said means for extracting for directly receiving said flow of said respired gas therein; and means for spraying water into said vessel as a mist.

4. A system as in claim 1 wherein said mixer comprises:

a vessel; and a jet pump coupled in-line between said means for extracting and said vessel, said jet pump being fed water from a source of water, said jet pump mixing said flow of said respired gas with the water fed thereto to form a gas/water mixture that is pressurized and injected into said vessel.

5. A system as in claim 4 wherein said jet pump is coupled to said vessel to inject said gas/water mixture into a water-filled portion of said vessel.

6. A system as in claim 4 wherein said jet pump is coupled to said vessel to inject said gas/water mixture into a gas-filled portion of said vessel.

7. A system as in claim 1 further comprising:

means for supplying water to said mixer from water in an environment surrounding the underwater habitat; and means for returning the water in said mixer to the water in the environment surrounding the underwater habitat.

8. A system as in claim 1 wherein said filter is a two-stage filter.

9. A system as in claim 1 wherein said filter comprises:
a first filter for filtering said first gas to produce a partially filtered gas;
an empty vessel coupled to said first filter for receiving said partially filtered gas therein; and
a second filter coupled to an upper portion of said empty vessel for filtering said partially filtered gas to produce said breathable gas.

10. A system as in claim 1 further comprising means for reducing the temperature of at least one of said respired gas and the water supplied to said mixer prior to being provided to said mixer.

11. A system as in claim 1 wherein said mixer includes means for pressurizing therein said respired gas and the water.

12. A system for supplying breathable gas to an underwater habitat submerged in a seawater environment, comprising:
means for extracting a flow of respired gas from the underwater habitat, said respired gas including carbon dioxide;
means for conveying seawater from the seawater environment;
a mixer, coupled to said means for extracting and said means for conveying, for mixing said flow of respired gas with said seawater from the seawater environment, wherein said carbon dioxide in said respired gas is substantially absorbed by said seawater from the seawater environment in said mixer and wherein a first gas is escapes from said seawater in said mixer;
a filter coupled to said mixer for filtering out moisture in said first gas to produce a breathable gas;
means for returning said breathable gas to the underwater habitat; and
means for transporting said seawater in said mixer back to the seawater environment.

13. A system as in claim 12 wherein said mixer comprises:
a vessel;
means for circulating water through said vessel; and
a diffuser, coupled in-line between said means for extracting and said vessel, for causing said flow of said respired gas to enter the water in said vessel as bubbles.

14. A system as in claim 12 wherein said mixer comprises:
a vessel coupled to said means for extracting for directly receiving said flow of said respired gas therein; and
means for spraying water into said vessel as a mist.

15. A system as in claim 12 wherein said mixer comprises:
a vessel; and
a jet pump having inlets coupled to said means for extracting and said means for conveying, said jet pump further having an outlet coupled to said vessel, said jet pump receiving said flow of said respired gas and said seawater from the seawater environment to form a gas/water mixture that is pressurized and injected into said vessel.

16. A system as in claim 15 wherein said jet pump is coupled to said vessel to inject said gas/water mixture into a water-filled portion of said vessel.

17. A system as in claim 15 wherein said jet pump is coupled to said vessel to inject said gas/water mixture into a gas-filled portion of said vessel.

18. A system as in claim 12 wherein said filter comprises:
a first filter for filtering said first gas to produce a partially filtered gas;
an empty vessel coupled to said first filter for receiving said partially filtered gas therein; and
a second filter coupled to an upper portion of said empty vessel for filtering said partially filtered gas to produce said breathable gas.

19. A system as in claim 12 further comprising means for reducing the temperature of at least one of said respired gas and said seawater from the seawater environment supplied to said mixer prior to being provided to said mixer.

20. A system as in claim 12 wherein said mixer includes means for pressurizing therein said respired gas and said seawater from the seawater environment.

21. A method of supplying breathable gas to an underwater habitat submerged in a seawater environment, comprising the steps of:
extracting a flow of respired gas from the underwater habitat, said respired gas including carbon dioxide;
conveying seawater from the seawater environment;
mixing said flow of respired gas with said seawater from the seawater environment, wherein said carbon dioxide in said respired gas is substantially absorbed by said seawater from the seawater environment and wherein a first gas escapes from said seawater;
filtering out moisture in said first gas to produce a breathable gas;
returning said breathable gas to the underwater habitat; and
directing said seawater back to the seawater environment.

22. A method according to claim 21 wherein said step of mixing comprises the steps of:
providing a vessel;
supplying said vessel with said seawater from the seawater environment; and
causing said flow of said respired gas to enter the water in said vessel as bubbles.

23. A method according to claim 21 wherein said step of mixing comprises the steps of:
providing a vessel; and
spraying said seawater from the seawater environment into said vessel.

24. A method according to claim 21 wherein said step of mixing comprises the steps of:
providing a vessel;
supplying said flow of said respired gas and said seawater from the seawater environment to a jet pump coupled to said vessel wherein a gas/water mixture is formed in said jet pump; and
injecting said gas/water mixture into said vessel using said jet pump.

25. A method according to claim 24 wherein said step of injecting includes the step of directing said gas/water mixture into a water-filled portion of said vessel.

26. A method according to claim 24 wherein said step of injecting includes the step of directing said gas/water mixture into a gas-filled portion of said vessel.

27. A method according to claim 21 wherein said step of filtering comprises the steps of:
filtering said first gas to produce a partially filtered gas;
supplying said partially filtered gas to an empty vessel; and filtering said partially filtered gas at an upper portion of said empty vessel for to produce said breathable gas.

28. A method according to claim 21 further comprising the step of reducing the temperature of at least one of said respired gas and said seawater from the seawater environment prior to said step of mixing.

29. A method according to claim 21 wherein said step of mixing includes the step of pressurizing said respired gas and said seawater from the seawater environment during said step of mixing.

* * * * *